United States Patent [19]

Chandler

[11] Patent Number: 5,009,602
[45] Date of Patent: Apr. 23, 1991

[54] ROTATIONAL MOVEMENT TRAINING APPARATUS

[76] Inventor: Clifton B. Chandler, 227 Brookwood Way, Mansfield, Ohio 44906

[21] Appl. No.: 500,582

[22] Filed: Mar. 28, 1990

[51] Int. Cl.$^5$ .................. G09B 23/02; G09B 23/04
[52] U.S. Cl. .................................. 434/300; 434/211; 434/365; 446/103
[58] Field of Search ............... 434/188, 211, 215, 276, 434/283, 300, 365, 128, 277, 278, 281, 406, 407; 446/103, 489, 102; 273/153 S

[56] References Cited

U.S. PATENT DOCUMENTS

| | | | |
|---|---|---|---|
| 1,171,816 | 2/1916 | Wagner | 446/102 X |
| 1,536,119 | 5/1925 | McDonald | 434/365 |
| 1,863,320 | 6/1932 | Anketell | 446/103 X |
| 1,991,854 | 2/1935 | Johansson | 434/365 |
| 3,562,926 | 2/1971 | Koral | 434/283 |
| 3,665,639 | 5/1972 | Knox | 446/489 |
| 4,395,041 | 7/1983 | Goldfarb et al. | 273/153 S X |

FOREIGN PATENT DOCUMENTS 0805364 12/1958 United Kingdom .............. 434/407

Primary Examiner—Richard J. Apley
Assistant Examiner—Joe H. Cheng
Attorney, Agent, or Firm—H. Jay Spiegel

[57] ABSTRACT

The present invention relates to an improved rotational movement training device which includes a mounting board and a plurality of rotation devices which, when mounted on a mounting board, provide a training device which permits a user through experimentation to develop mathematical expressions and mechanical systems from elementary scientific facts and basic mathematics. The rotational devices includes gears or wheels of different diameters, pistons, torque levers, force and load pans, fulcrum-levers and devices to interconnect the wheels and pistons such as levers, belts, and adjustable spacers. The devices may be used in various combinations to develop and demonstrate mechanical movement concepts and expressions.

11 Claims, 8 Drawing Sheets

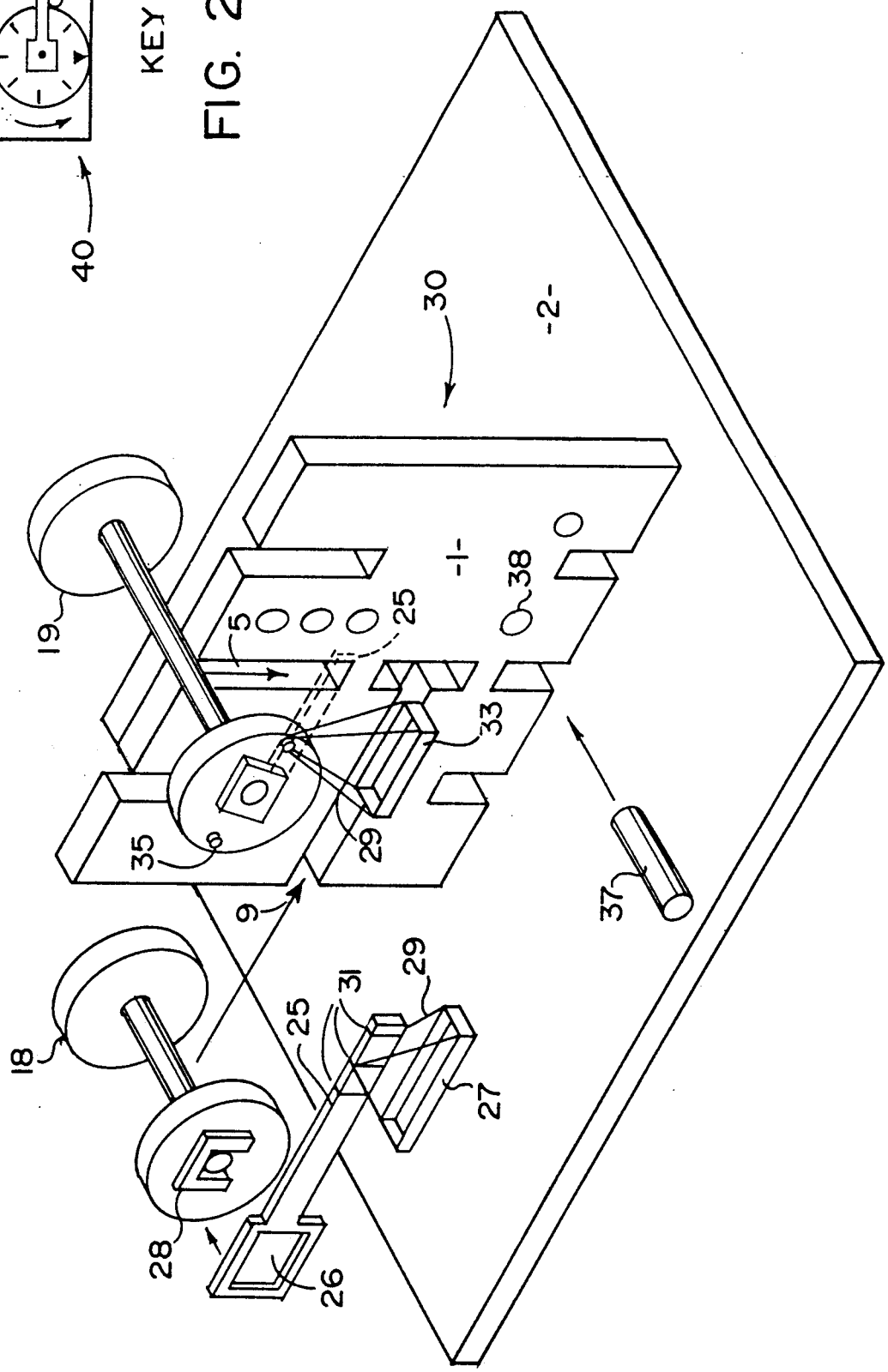
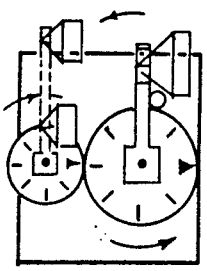
FIG. 2
FIG. 2A

KEY

KEY

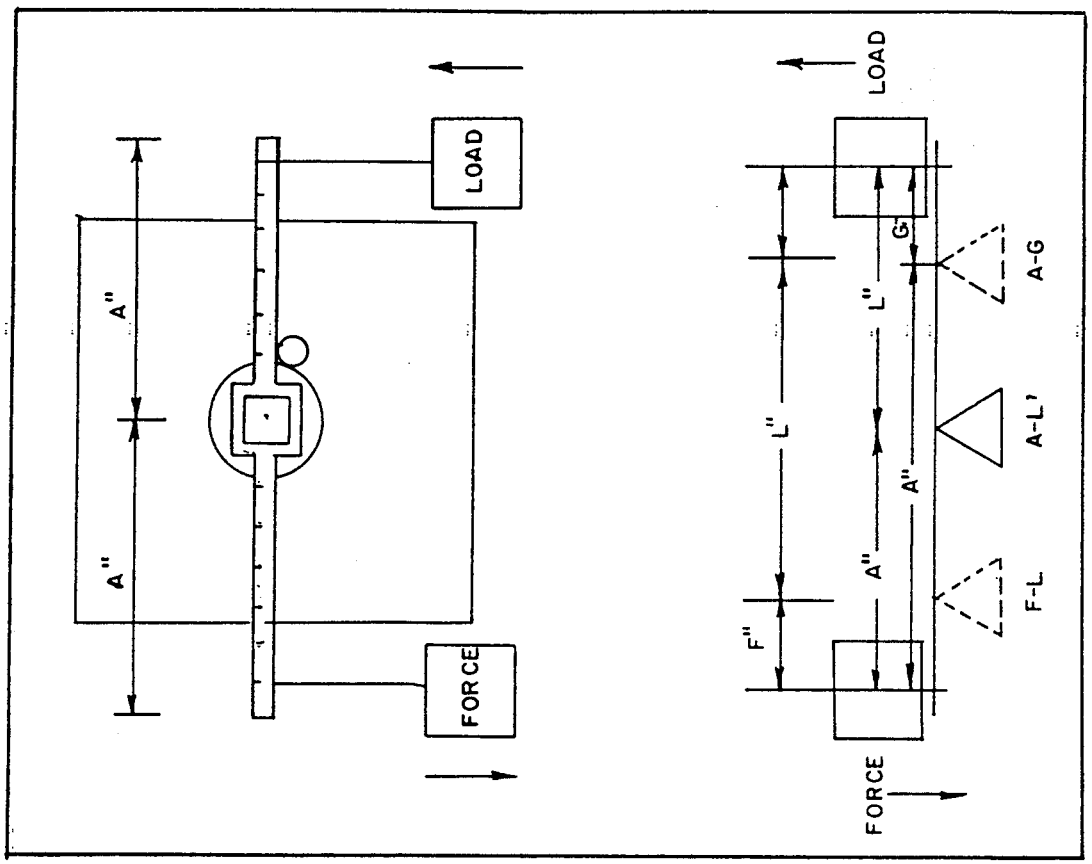
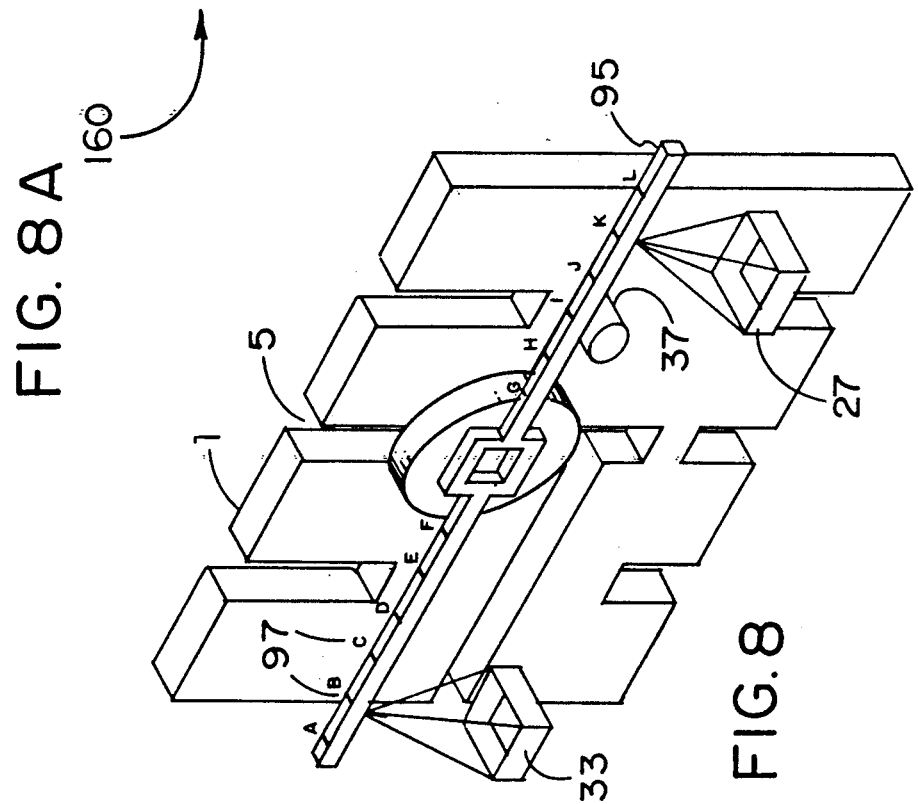
FIG. 8A
FIG. 8

ROTATIONAL MOVEMENT TRAINING APPARATUS

BACKGROUND OF THE INVENTION

The present invention relates to an improved rotational motion training device. In the prior art, devices which are designed to be used to demonstrate some aspect of science or mathematics are known. U.S. Pat. No. 2,929,159 to Feldhake and U.S. Pat. No. 3,995,380 to Nasir are examples of these types of devices. However, Applicant is unaware of any prior art that teaches or fairly suggests all of the features of the present invention including a mounting board having a plurality of slotted openings therein which engage a variety of movable devices for demonstrating various scientific principles and concepts.

SUMMARY OF THE INVENTION

The present invention relates to an improved rotational movement training device. The present invention includes the following interrelated aspects and features:

(a) In the first aspect, the present invention includes a mounting board having a plurality of openings therein. These openings are configured to engage various devices to demonstrate scientific principles and rotational movements. The openings include a plurality of slotted openings along the top and bottom edges of the mounting board as well as a slotted opening on one side thereof and circular openings at specific locations therein.

(b) The mounting board may be equipped with various devices such that when the mounting board is moved in a particular direction, the devices demonstrate a particular rotational movement. The devices are adapted to engage one or more of the slots and/or openings in the mounting board in a predetermined configuration.

(c) The inventive device also includes at least two gear wheel shaft assemblies, each gear wheel shaft assembly comprising a pair of gear wheels mounted on the ends of a shaft. In the set of gear wheel shaft assemblies, the gear wheels may be of the same or different diameters. Using the gear wheel shaft assemblies in conjunction with the mounting board, a user may determine by observation particular rotational movement and derived expressions based thereon.

(d) Other devices may be used in conjunction with the gear wheel shaft assemblies to demonstrate other scientific principles and rotational movements. These devices include torque levers and force pans, the torque levers attached to the end of a gear wheel, the force pan attached at the end of the torque lever. Additionally, tensioners, connecting levers, and pistons may be utilized to demonstrate various rotational movements.

(e) In an alternative embodiment, a pair of mounting boards may be utilized, the mounting boards connected by attachment means to demonstrate more complex scientific principles and rotational movements. In this embodiment, devices may be attached to and between the mounting boards to simulate a desired experiment.

(f) The mounting board and various devices may also be used in combination with a motor, whereby the motor would provide the desired movement to illustrate a particular scientific principle.

Accordingly, it is a first object of the present invention to provide an improved rotational movement training device.

It is a further object of the present invention to provide a rotational movement training device that permits a user to visualize a rotational movement and derive a mathematical expression therefrom.

It is a yet further object of the present invention to provide an improved rotational movement training device that may be adapted through the use of various devices to illustrate a wide range of different scientific and mathematical principles.

These and other objects, aspects and features of the present invention will be better understood from the following detailed description of the preferred embodiments when read in conjunction with the appended drawing figures.

BRIEF DESCRIPTION OF THE DRAWINGS

FIG. 1A shows a key illustrating movement for the embodiment depicted in FIG. 1.

FIG. 2 shows a perspective view of another exemplary use of the inventive device including torque levers and force pans.

FIG. 2A shows a key illustrating movement for the embodiment depicted in FIG. 2.

FIG. 8 shows a perspective view of a sixth exemplary use of the inventive device including the use of a fulcrum-lever.

FIG. 8A shows a key illustrating movement for the embodiment depicted in FIG. 8.

SPECIFIC DESCRIPTION OF THE PREFERRED EMBODIMENTS

Figure 1:
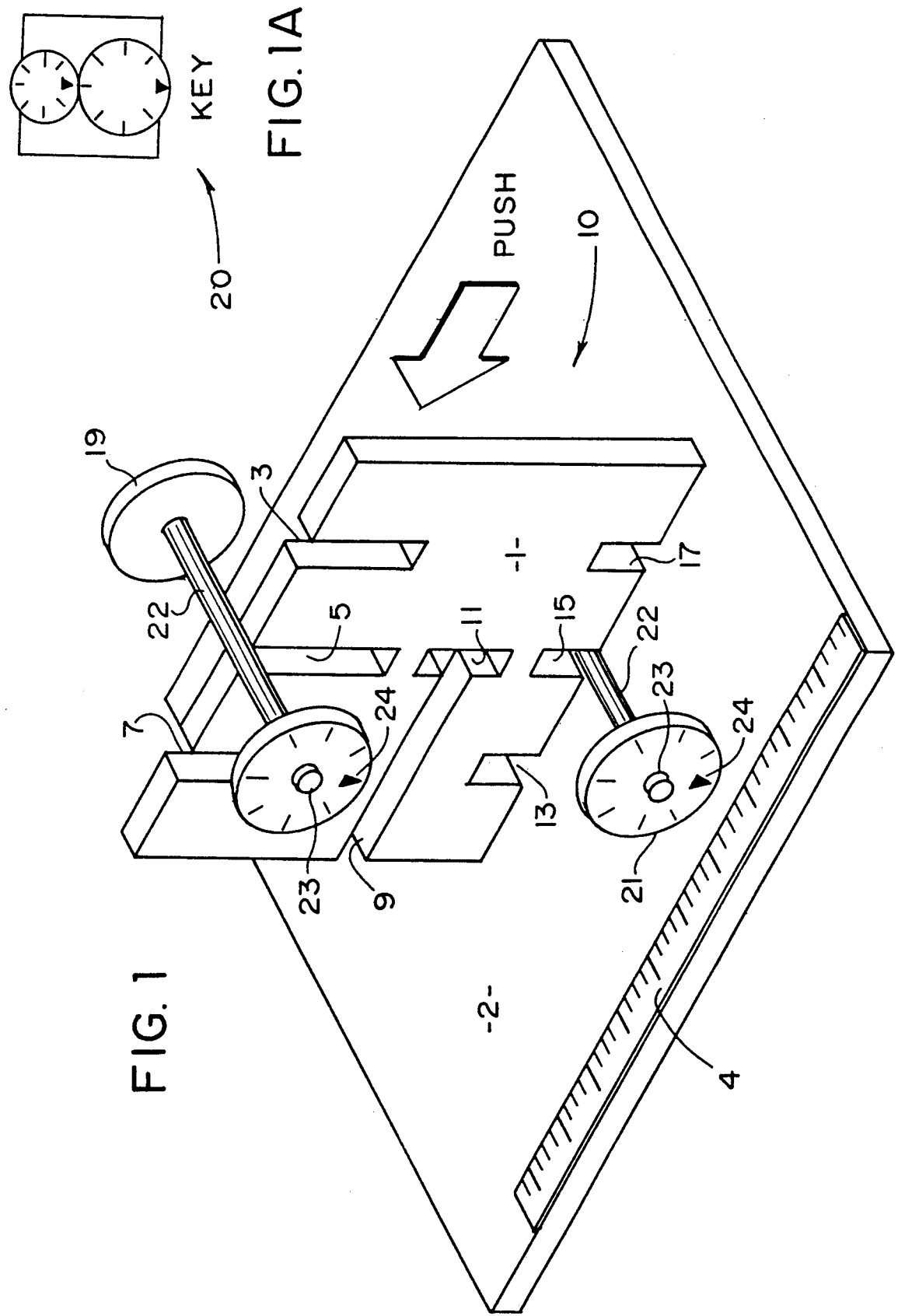
FIG. 1 shows a perspective view of the mounting board in combination with a pair of gear wheel shaft assemblies.

With reference, firstly, to FIG. 1, the present invention is generally designated by the reference numeral 10 and is seen to include a mounting board 1 having a plurality of openings therein. Along the top edge of the mounting board 1 are slots 3, 5 and 7 with the slots 3 and 7 being of the same length and slot 5 being slightly longer in length. On one side of the mounting board 1 is a slot 9 which terminates in a second slot 11, the slot 11 being perpendicular to the slot 9. On the bottom edge of the mounting board 1 are three more slots, 13, 15 and 17. Each of these slots is aligned with the opposing slot on the top edge of the mounting board 1.

In combination with the mounting board 1, as shown in FIG. 1, are a pair of gear wheels 19 connected together by a shaft 22. A second gear wheel shaft assembly is shown by a pair of gear wheels 21 connected by a shaft 22. Each gear wheel shaft assembly includes a hub 23 centrally located on each gear wheel, the hub 23 facilitating attachment of other devices to the gear wheel, such other devices to be used in additional experiments to be described hereinafter. The gear wheels have indicia arrows 24 thereon to permit a user to record rotational movements when the device is being used.

With reference, to FIG. 1A, the key 20 demonstrates how the indicia arrows 24 ar used. When utilizing the device, a user will line up the indicia arrows 24 and then push the board in the direction of the arrow indicated in FIG. 1A, thereby moving the lower gear wheel 21 as it contacts the table surface 2. A user may then observe how many revolutions the upper gear wheel 19 has moved with respect to one revolution of the lower gear wheel 21. In addition, the distance travelled by the lower gear wheel 21 may be measured by recording the starting point of indicia arrow 24 and the ending point after one revolution by use of the ruler 4 located on the table 2.

FIG. 2 shows a configuration using the gear wheel shaft assemblies in combination with other devices to demonstrate another mechanical and mathematical pattern. As can be seen from the drawing, the gear wheel shaft assembly 18 includes a torque lever 25 which fits onto the gear wheel shaft assembly 18 through use of the torque lever adapter 28 fitting into the opening 26 of the torque lever 25. The torque lever 25 also includes slotted openings 31 which support a load pan 27 by the load pan suspension wires 29. The other gear wheel shaft assembly 19 includes pins 35 which support a force pan 33 through the force pan suspension wires 29. In this experiment, the gear wheel shaft assembly 18 engages slot 9 with the gear wheel shaft assembly 19 engaging slot 5. Also shown in FIG. 2 is the torque lever stabilizing pin 37, which is inserted into circular opening 38 and supports the torque lever 25 as shown in the key 40 in FIG. 2A. It should be noted that the force pan 33 may be attached to the upper gear wheel shaft assembly 19 by an additional torque lever bar 25 shown in phantom, rather than being supported by the pin 35. In this force configuration setup, a user may experiment with different combinations of gear wheel assembly diameters and derive mathematical expressions based upon observation of the mechanical and mathematical patterns.

Figure 3A:
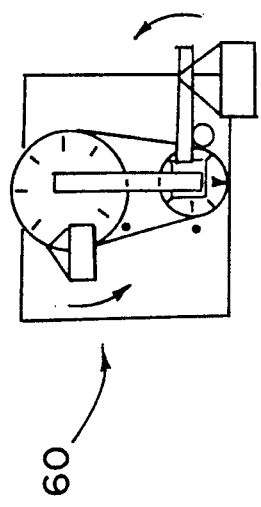
FIG. 3A shows a key illustrating movement for the embodiment depicted in FIG. 3.
Figure 3:
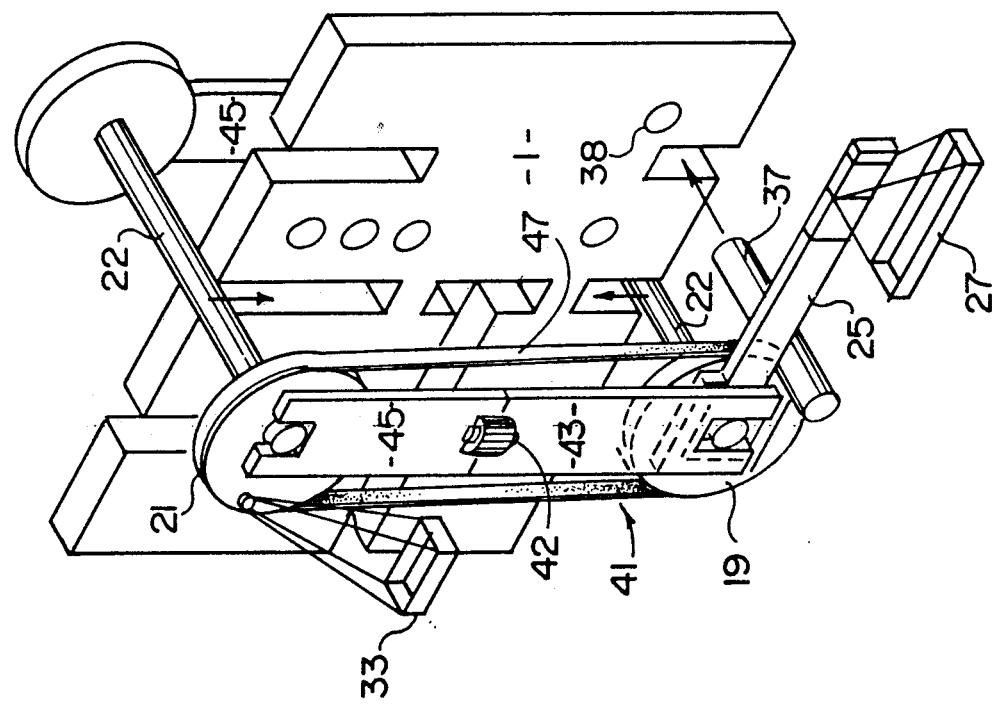
FIG. 3 shows a third exemplary use of the inventive device including a belt drive and tensioner.

FIG. 3 shows a similar configuration to that depicted in FIGS. 1 and 2 and is seen to include a pair of gear wheel shaft assemblies connected by a spacer 41. The spacer 41 comprises portions 43 and 45 separated by the thumb wheel length adjuster 42. The thumb wheel length adjuster may control the tension of the belt 47 when attached to the gear wheels 19 and 21. In this configuration, the upper gear wheel 21 may also include a force pan 33 attached thereto with the lower gear wheel 19 having the torque lever 25 and load pan 27 attached thereto. Finally, the torque lever stabilizing pin 37 is shown to support the torque lever 25 by engaging the opening 38 in the mounting board 1. When comparing this configuration to the configurations depicted in FIGS. 1 and 2, a user should discover that the existence of the belt driven system will result in a resulting different direction of rotation.

Figure 4A:
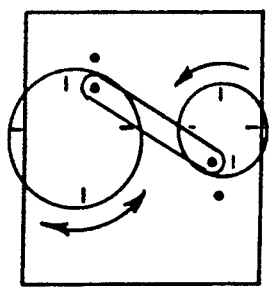
FIG. 4A shows a key illustrating movement for the embodiment depicted in FIG. 4.
Figure 4:
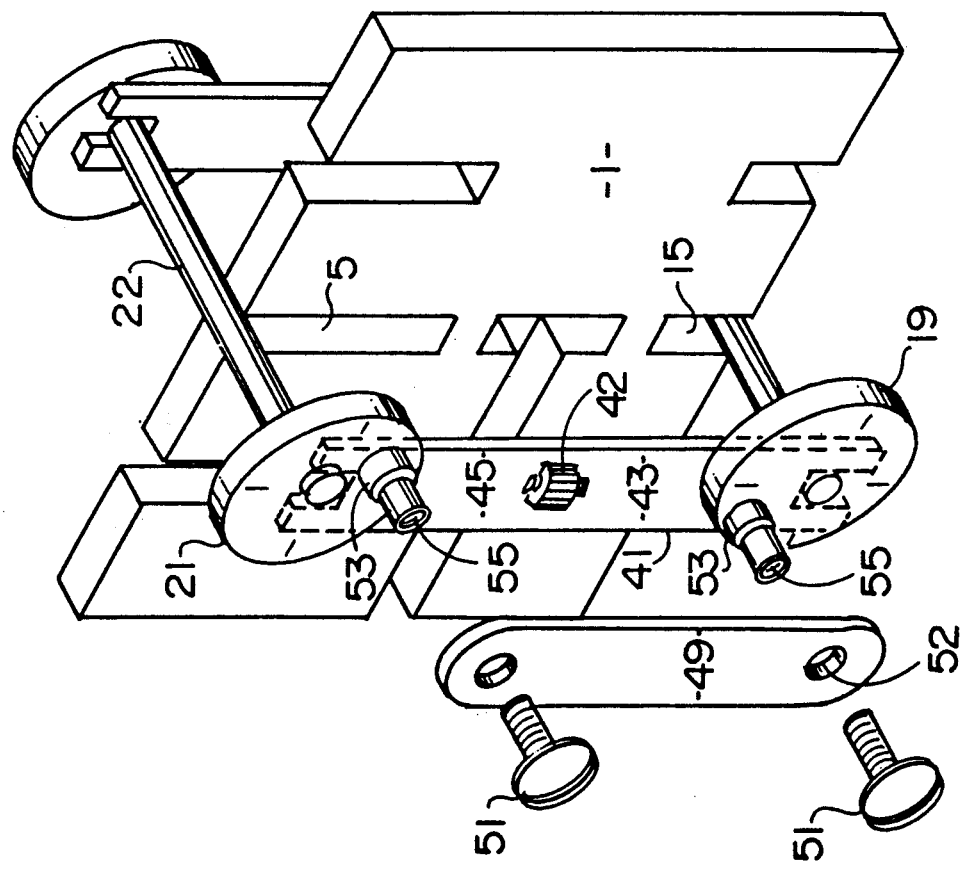
FIG. 4 shows a fourth exemplary use of the inventive device illustrating the use of a connecting lever.

With reference to FIG. 4, a fourth exemplary use of the inventive device is generally designated by the reference numeral 70, and is seen to include the gear wheel shaft assemblies 19 and 22 connected by both the spacer 41 and a connecting lever 49. The connecting lever 49 is attached to the gear wheels by the pin 53 located on the gear wheel having an opening 55 therein for receiving the screw 51. With further reference to FIG. 4A, the key 80 exemplifies the reciprocating motion demonstrated by this particular configuration.

Figure 5A:
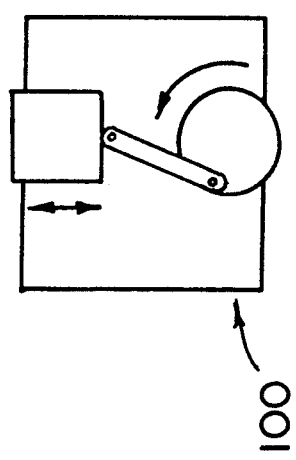
FIG. 5A shows a key illustrating movement for the embodiment depicted in FIG. 5.
Figure 5:
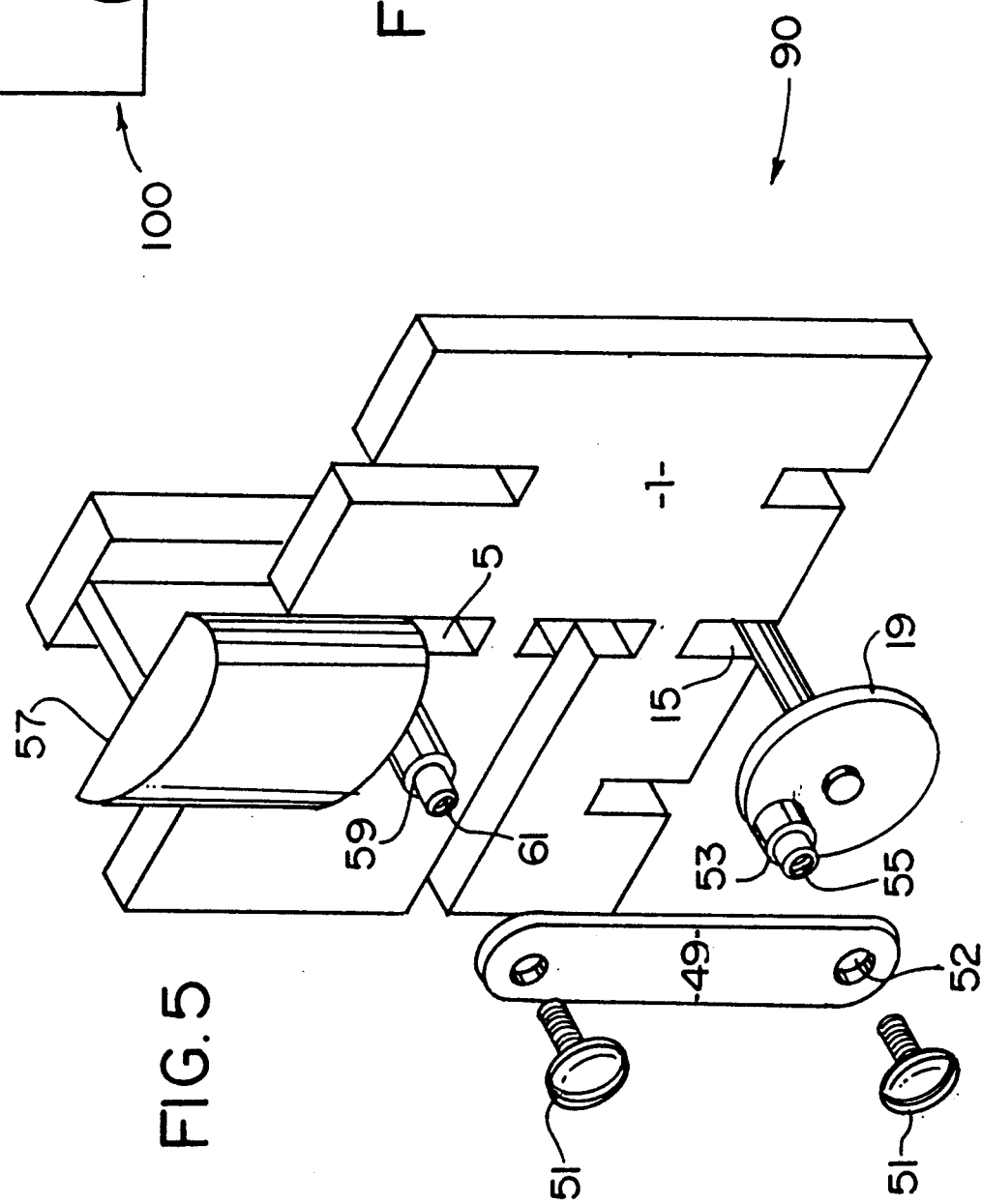
FIG. 5 shows a perspective view of a fifth exemplary use of the inventive device including the use of a piston.

With reference to FIG. 5, another exemplary use of the inventive device is generally designated by the reference numeral 90 and is seen to include the use of a piston 57 in combination with the gear wheel shaft assembly 19. As can be seen from FIG. 5, the piston 57 has a pin 59 with an opening 61 therein to permit connection of the piston 57 to the gear wheel shaft assembly 19 by the connecting lever 49. The connecting lever 49 is attached in the same manner as described for the exemplary use described in FIG. 4. In this particular configuration, and as shown in the key 100 in FIG. 5A, a method is shown to transform rotational movement into linear movement.

Figure 6:
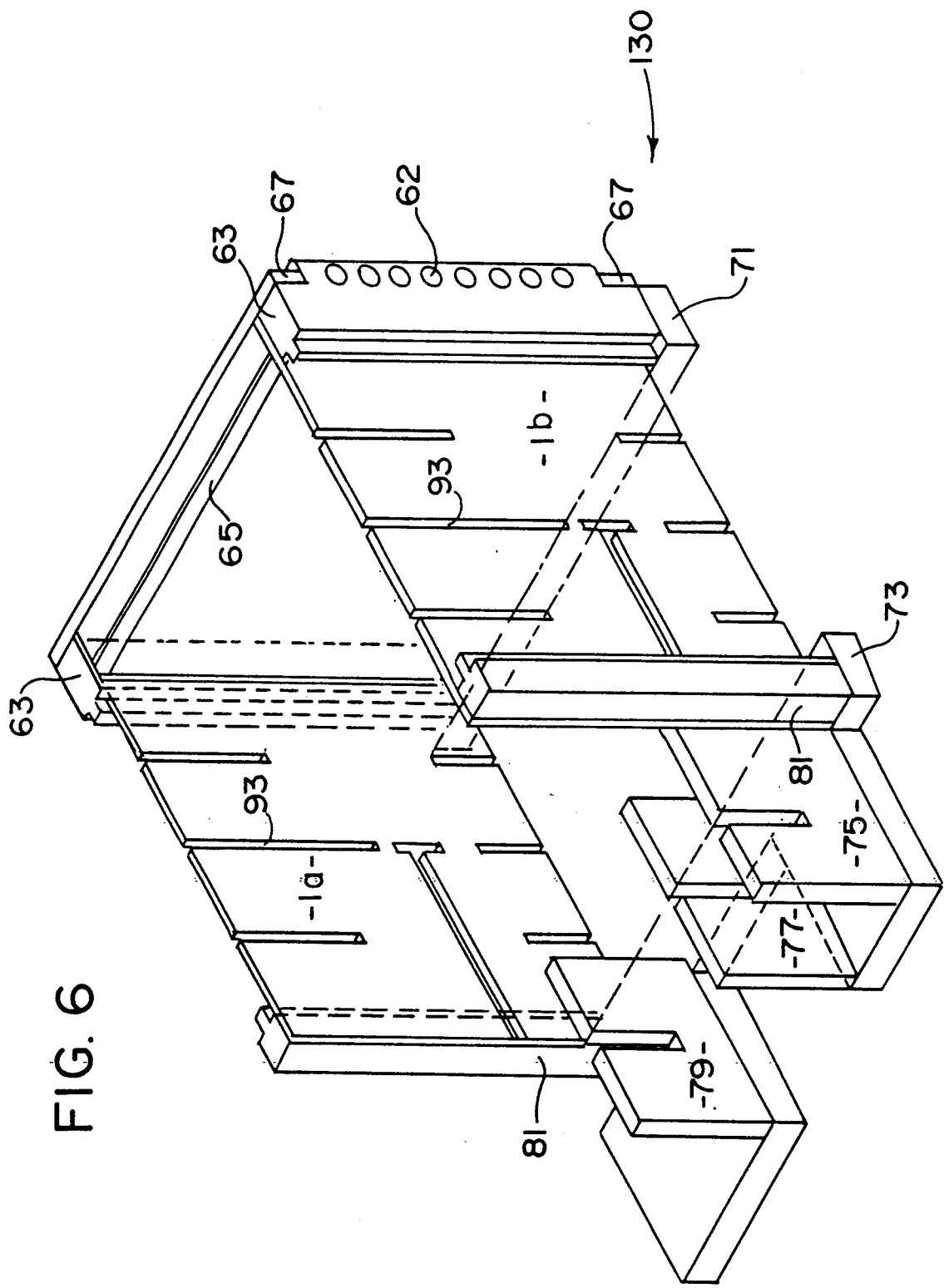
FIG. 6 shows a additional embodiment of the present invention, including the use of two mounting boards.

With reference to FIG. 6, an additional embodiment of the inventive device is illustrated and generally designated by the reference numeral 130. As can be seen from this drawing, a pair of guide boards 1a and 1b are shown attached by various means to permit a more expansive demonstration of a variety of scientific experiments and principles. In the experiments of FIGS. 2, 3 and 8, FIG. 8 to be described hereinafter, the mounting board 1 can be inserted from the top down between the left guide post 81 and right guide post 63 of either side of the additional embodiment to facilitate upright and stable usage. For comprehensive use of this additional embodiment, two mounting boards 1 are necessary. In this configuration, the guide boards 1a and 1b are connected on one end thereof by a right base 71, end boards 65, guide posts 63 and a slide guide 67. The guide posts 63 have openings 62 therein to facilitate conducting experiments in this particular embodiment. The other end of the guide boards 1a and 1b are connected by the left base 73 and left guide posts 81. Mounted on the left base 73 are support members 75, 77 and 79, which may be utilized to mount various devices such as gear wheel shaft assemblies and/or motor assemblies.

Figure 7:
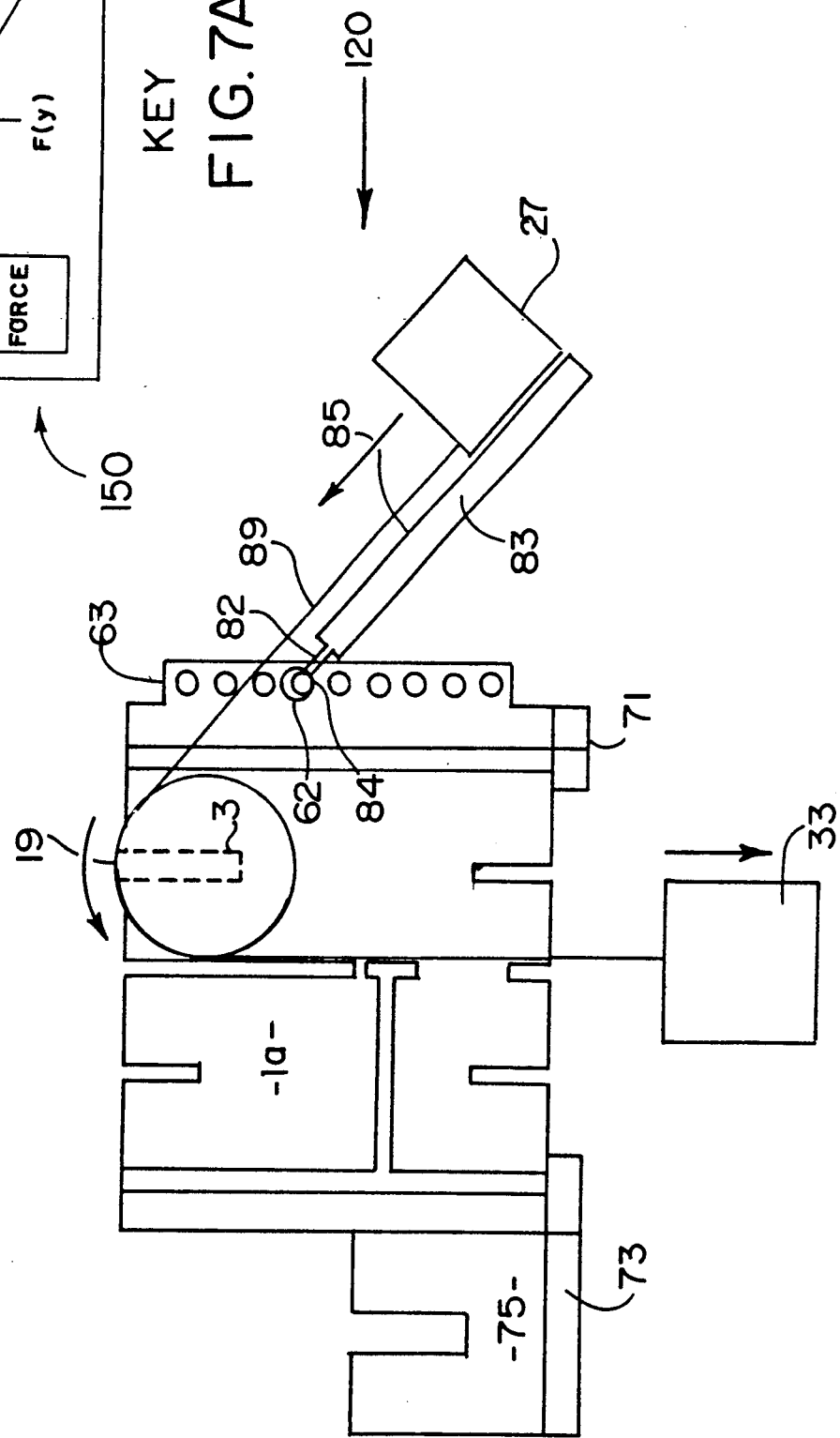
FIG. 7 shows an exemplary use of the additional embodiment of the present invention.
Figure 7A:
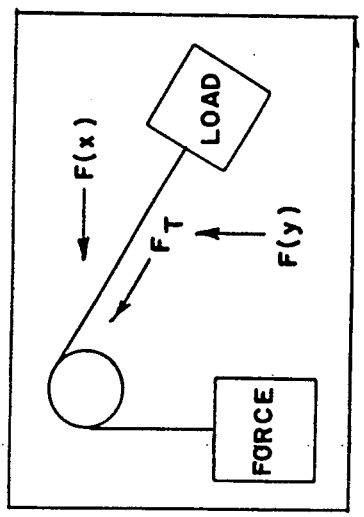
FIG. 7A shows a key illustrating movement for the embodiment depicted in FIG. 7.

FIG. 7 shows an exemplary use of the additional embodiment of the mounting boards depicted in FIG. 6. In this configuration, generally designated by the reference numeral 120, a configuration is depicted to illustrate an inclined plane experiment. As can be seen from the drawing, a slide board 83 is connected to the opening 62 in the guide post 63 via the stem 82. Placed on the surface of the slide board 83 is a load pan 27 which is connected by a wire or belt 89 to an opposite force pan 33. A low friction material 85 is attached to 83 to increase accuracy. The wire 89 connecting the load pan 37 and force pan 33 wraps around the gear wheel 19, which engages slot 3 in the guide board 1a. In this configuration, utilizing the force pan 33, the force components of the load pan 27 may be derived through experimentation as illustrated in the key 150 shown in FIG. 7A.

With reference to FIG. 8, another exemplary use of the inventive device is illustrated and is seen to include the use of a fulcrum-lever 95 in combination with the gear wheel shaft assembly 19. The fulcrum lever 95 is positioned in the slot 5 of the mounting board 1 and includes therein a plurality of slots 97. Positioned on one end of the fulcrum-lever 95 is a force pan 33 engaging one of the slots 97 with a load pan 27 positioned on the opposite end of the fulcrum lever 95. The fulcrum-lever 95 is supported on one end by the pin 37. The fulcrum-lever configuration demonstrates how a lever increases the force supplied to a load a fulcrum is properly positioned. With reference to the key 160 and FIG. 8 again, the placement of the force pan 33 at various points along the fulcrum-lever 95 and the load pan 27 at various points along the opposite end of the fulcrum-lever 95 will result in repositioning of the fulcrum point. As can be seen from the key 160 key in FIG. 8A, location of the force pan at letter A on the fulcrum-lever and the load pan on letter L results in the fulcrum point being equally distant between the force pan and the load pan. The movement of the fulcrum may be simulated by changing the positions of either the load pan and/or the force pan. For example, placing the force pan at the letter F and the load pan at the letter L results in the fulcrum FL depicted in phantom in the key 160 being shifted to the left. In a similar manner, positioning the force pan at the letter A and the load pan at the letter G results in the fulcrum AG being shifted to the right.

Another manner of using the fulcrum lever depicted in FIG. 8 will now be described. Once the fulcrum-lever 95 is mounted in the gear wheel assembly 19 and positioned on pin 37 and in slot 5, a force pan 33 and a load pan 27 are placed in one of the slots 97 along the length of the fulcrum-lever. By placing a known load in the load pan and adding a plurality of smaller loads into the force pan, until the fulcrum-lever raises off the pin 37, it can demonstrated how a lever increases the force supplied to a given load when a fulcrum is properly positioned. The position of the force pan may be changed with respect to the load pan to further demonstrate the above mentioned principle. In addition, the load pan may be repositioned and the same weighting experiment may be performed using the force pan.

The improved rotational movement training device allows a user to develop scientific thought processes and sensitivity to physical and mathematical patterns that facilitate solving the technical challenges of the future. Using the inventive device permits the development of mathematical expressions of mechanical systems from elementary scientific facts and basic mathematics as based upon experimentation. For example, the improved rotational motion training device may be utilized to prove that the speed/force manipulation by gear train assemblies is a function of the radii of the gears in the assembly. A user may prove this relationship by observation of the gear trains utilized in the configuration as depicted in FIG. 1. In the configuration depicted in FIG. 1, a user may observe the number of gears, the radius of each gear, the directional movement of each gear with respect to the other gear as well as the revolutions travelled both in a rotational manner and a linear manner.

The particular configuration of the slotted openings and the circular openings in the mounting board permit a vast number of experiments and configurations to be utilized to permit a user to develop a myriad of mathematical expressions dealing with rotational movement. The inventive device may be made out of any materials, but preferred materials would include either wood or plastic. The gear wheel assemblies may be provided in a variety of diameters to facilitate derivation of the variety of mathematical expressions available.

The improved rotational motion training device may utilized in elementary schools, high schools or colleges, since the inventive device may be adapted for very simple experiments or can be configured to demonstrate extremely complex concepts.

As such, an invention has been disclosed in terms of a preferred embodiment thereof which fulfills each and every one of the objects of the present invention as set forth hereinabove and provides a new and improved rotational movement training device of great utility and novelty.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:
1. An improved rotational movement training device comprises:
 (a) mounting board means comprising at least one mounting board, said mounting board comprising:
  (i) a top portion having a plurality of slots therein;
  (ii) middle portion having a plurality of slots therein; and
  (iii) a bottom portion having a plurality of slots therein; and
 (b) a plurality of rotational means engageable in at least two of said slots for demonstrating a rotational movement;
 (c) whereby movement of said mounting board means results in movement of said rotational means thereby facilitating derivation of a scientific and mathematical concept.

2. The invention of claim 1, wherein said rotational means comprises at least two gear wheel-shaft assemblies.

3. The invention of claim 2, wherein each said gear wheel-shaft assemblies comprises a pair of gear wheels mounted on a shaft.

4. The invention of claim 2, wherein said gear wheel-shaft assemblies comprises two different diameter gear wheel-shaft assemblies.

5. The invention of claim 2, wherein said rotational means further comprises at least a torque lever and a load pan removably attachable to one of said gear wheel shaft assembly.

6. The invention of claim 2, wherein said rotational means further comprises a removable connecting lever for connecting together with said gear wheel-shaft assemblies.

7. The invention of claim 2, wherein said rotational means further comprises an adjustable length spacer bar removably attachable to one of said gear wheel-shaft assembly.

8. The invention of claim 7, wherein said rotational means further comprises a belt for connecting said gear wheel-shaft assemblies.

9. The invention of claim 1, wherein said rotational means comprises a gear wheel-shaft assembly, a connecting lever and a piston.

10. The invention of claim 1, wherein said mounting board means further comprises two mounting boards and means to removably connect each of said mounting board together.

11. The invention of claim 1, wherein said rotational means comprises a fulcrum-lever removably attachable to a wheel-shaft assembly for engaging in one of said slot for demonstrating the use of said fulcrum-lever.

* * * * *